UNITED STATES PATENT OFFICE.

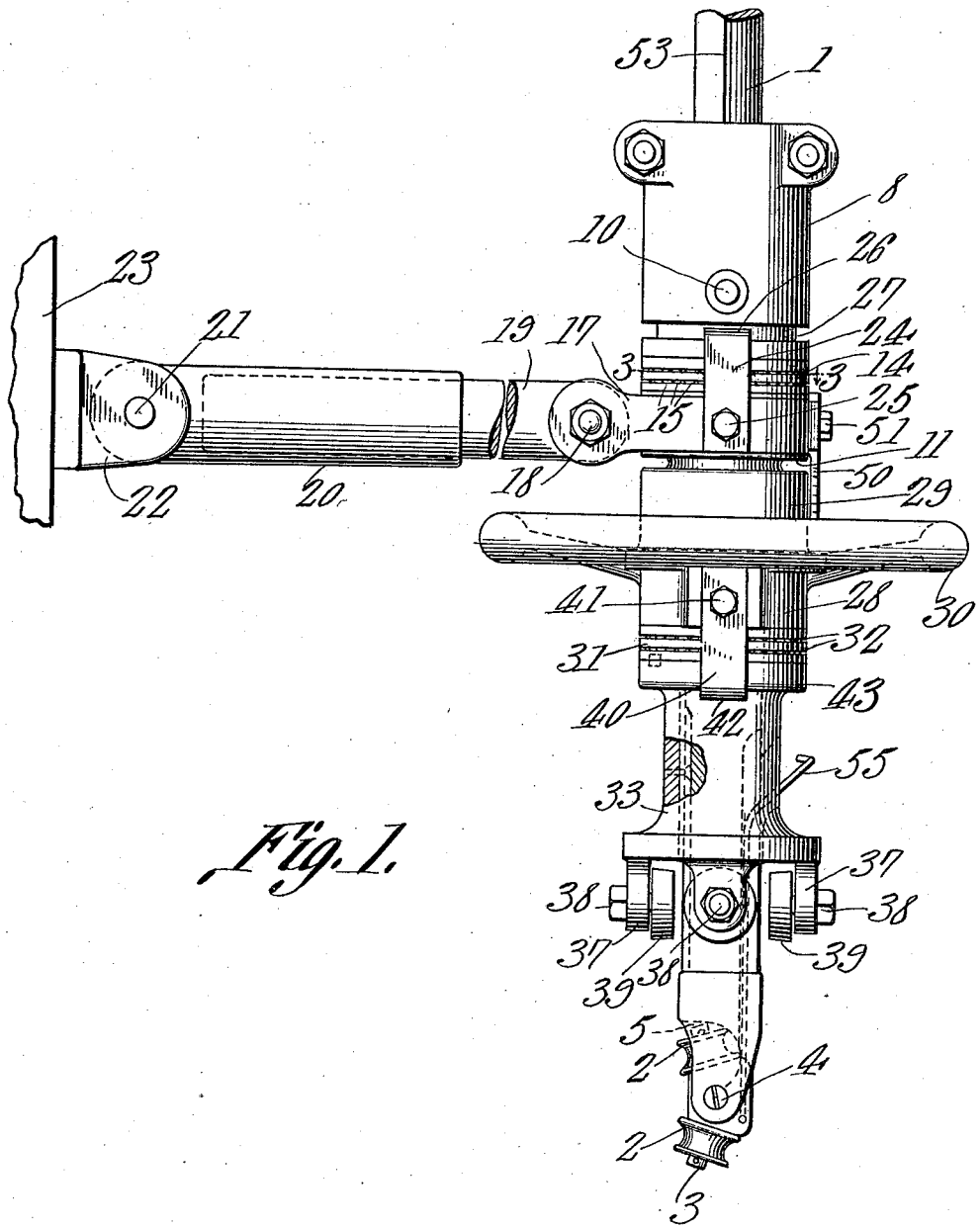

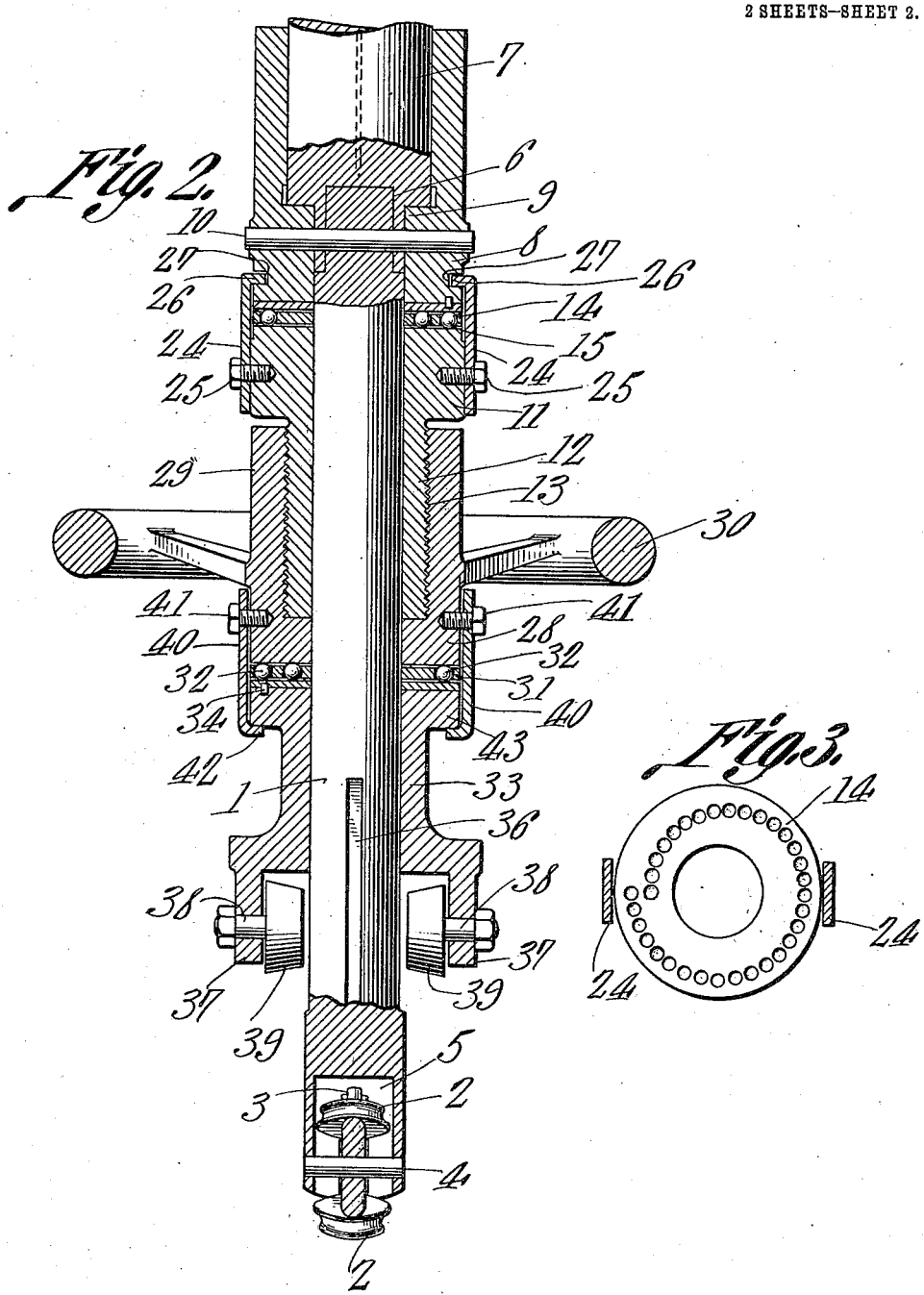

FRANK X. PFLUGER, OF PORTLAND, OREGON.

BUSH-FLANGER.

1,014,902.  Specification of Letters Patent.  Patented Jan. 16, 1912.

Application filed December 27, 1910. Serial No. 599,364.

*To all whom it may concern:*

Be it known that I, FRANK X. PFLUGER, a citizen of the United States, residing at Portland, in the county of Multnomah and State of Oregon, have invented a new and useful Bush-Flanger, of which the following is a specification.

This invention relates to bush flangers and expanders.

The present invention is an improvement on the constructions forming the subject matter of United States Patents No. 810,431 of January 23, 1906, and No. 926,706 of August 3, 1909, both granted to Frank Pfluger and Emil Christensen.

In the patents referred to, the feed mechanism for the flanging rollers was dependent for its operation on a feed wheel which was movable relatively to the flanging roller. It is found in practice that this feed mechanism of the prior devices is defective in that the feed wheel is liable to become uncontrollable by the operator and thus interfere with the efficiency of the mechanism.

The principal objects of the present invention are to improve and simplify the arrangement of the feed mechanism as well as to increase the efficiency thereof in operation.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming a part of this specification:—Figure 1 is a side elevation of a bush flanger and expander constructed in accordance with the invention. Fig. 2 is a vertical section, partly in elevation, of the construction illustrated in Fig. 1. Fig. 3 is a horizontal section on the line 3—3 of Fig. 1.

Like reference numerals indicate corresponding parts in the different figures of the drawing.

The bush flanger of the present invention is constructed with a spindle 1 which is provided at the lower end thereof with a pair of flanging rollers 2—2 journaled on a shaft 3 which is centrally fulcrumed as indicated at 4 whereby the rollers 2 may be thrown into alinement with a recess 5 in the lower end of the spindle 1 so as to facilitate the insertion of said spindle and rollers through the bushing which is to be flanged. This arrangement of the flanging rollers is shown in the patents previously referred to.

The spindle 1 at its upper end preferably although not essentially is reduced as indicated at 6 and is fitted into a suitable socket formed in an enlarged spindle extension 7. Surrounding the upper end of the spindle 1 at the lower end of the spindle extension 7 is a sleeve member or abutment 8 which is formed internally with shoulders 9 to engage the enlarged lower end of the spindle extension 7. The abutment 8, spindle 1 and spindle extension 7 are locked rigidly in engagement with each other by means of a transversely extending pin 10. The abutment 8, as will hereinafter appear, acts as an annular shoulder for receiving the upward thrust of the feed mechanism and thus serves to raise the flanging rollers during the flanging operation.

Loosely surrounding the spindle 1 below the abutment 8 is a feed member 11 which is in the form of a sleeve or collar having a downwardly extending tubular portion 12 which is externally screw-threaded as indicated at 13. Interposed between the feed member 11 and the abutment 8 is a washer 14, a spirally extending series of anti-friction balls 15 being disposed between the washer 14 and the feed member 11 as indicated most clearly in Fig. 3 of the drawing. By arranging the anti-friction balls 15 in the volute or spiral relation shown in Fig. 3, flattening of the balls is prevented, as well as the wearing of annular grooves or raceways of too great a depth in the washer 14 and feed member 11.

For the purpose of holding the feed members 11 against rotation while permitting free rotation of the spindle 1 and abutment 8, this feed member 11, as shown in Fig. 1 of the drawing, is provided with an ear or extension 17 to which is pivotally connected by means of a bolt 18 a guide arm 19 which telescopes within a guide arm member 20 which is pivotally connected at 21 with a bracket 22 secured to any suitable support 23. The extensible guide arm described, constitutes means for preventing rotation of the feed member 11 while permitting free vertical movement thereof.

For the purpose of holding the non-rotary feed member 11 in assembled position with the abutment 8, without interfering with the rotation of said abutment, the feed member 11 is provided with upwardly extending arms 24 which are secured to said feed member by means such as the tap screws 25. The arms 24 at their upper ends are extended inwardly as indicated at 26 so as to engage an annular groove 27 formed in the abutment 8.

The upper feed member 11 is engaged by a lower feed member 28 which is in the form of a collar loosely surrounding the spindle 1 and provided with an upwardly extending tubular portion 29 which surrounds the extension 12 of the feed member 11 and is internally screw-threaded so as to engage the threads of the extension 12. The lower feed member 28 is provided with a hand wheel 30 by means of which it may be rotated to cause the feed members 11 and 28 to move axially toward or away from each other. Arranged below the feed member 28 is a washer 31, a plurality of anti-friction balls 32 being interposed between the washer 31 and the feed member 28. The washer 31 bears against the upper end of a thrust member or collar 33 and is keyed thereto by means of the dowel pin 34. The thrust member 33 is keyed or feathered on the spindle 1 in any suitable manner. The thrust member 33 adjacent its lower end is provided with a tubular extension 37 through which are passed a plurality of stud shafts 38 having the thrust rollers 39 journaled on their inner ends in the manner shown in the hereinbefore referred to patents. The thrust rollers 39 serve to engage the upper ends or flanged portions of the bushing which is to be turned outward or flanged in the usual manner at its lower ends by means of the rollers 2.

For the purpose of holding the thrust member 33 in proper relation to the lower feed member 28, the lower feed member is provided with downwardly extending arms 40 secured thereto by means of the cap screws 41 and having their lower ends turned inwardly as indicated at 42 so as to engage beneath the enlarged upper end 43 of the thrust member 33.

For the purpose of gaging the distance which the bushing is to be flanged, the upper feed member 11, as shown in Fig. 1, is provided with a downwardly extending arm 50 which is secured to said upper feed member 11 by means of the set screw 51. The arm 50 is provided with scale marks or graduations as shown clearly in the drawings so as to coöperate with the upper end of the lower feed member 28 for the purpose of determining the exact distance said feed members have been separated from each other during the feeding operation.

It is to be understood that any suitable mechanism is employed for rotating the spindle 1 in such manner as to permit it to rise during the rotary movement thereof. For this purpose, the spindle 1 as shown in Fig. 1 is preferably formed with a key slot 53.

Constructed as described, the operation of the device is substantially as follows: After the bushing which is to be flanged has been inserted in the barrel in any suitable manner, the spindle 1 is extended downward through the bushing and the flanging rollers 2 are moved upon their fulcrum by means such as a longitudinally extending draw rod 55 which forms a part of the prior construction hereinbefore referred to and is mounted in a slot 36 formed in spindle 1. The thrust rollers 39 are adjusted downward onto the upper surface of the flange. The extensible arm 20 serves to permit the thrust device 33 to be adjusted to the proper vertical position which, is of course, determined by the size of the barrel or keg in which the bushing is to be planted. The spindle 1 is now thrown into operation in any suitable manner and its rotation causes the flanging rollers 2 to spread the lower end of the bushing. By now turning the feed wheel 30 in the proper direction, the upper feed member 11 is raised and, through the anti-friction devices 15, serve to raise the abutment 8 and the spindle 1. The flanging rollers 2 on the spindle 1 are thus moved nearer to the thrust rollers 39 on the thrust member 33. From time to time, the feed wheel 30 is operated to raise the abutment 8 and spindle 1. Each time the abutment 8 is raised by means of the upper feed member 11, the graduated arm 50 moves upward relative to the lower feed member 26 and thus indicates the extent to which the bushing has been flanged.

The bush flanger of the present invention is strong, simple, durable and comparatively inexpensive in construction as well as thoroughly practical and efficient in operation.

What is claimed is:—

1. A bush flanger comprising a spindle, flanging rollers mounted on said spindle, a fixed abutment on said spindle, a movable thrust element on said spindle having thrust rollers mounted thereon, a feed member having a swiveled connection with said abutment, and a second feed member coöperating with said first mentioned feed member and having a swivel connection with said thrust member.

2. A bush flanger comprising a spindle, flanging rollers pivotally mounted on the lower end of said spindle, an abutment fixed on said spindle, a thrust element keyed on said spindle and having thrust rollers, an upper feed member having a swivel connection with said abutment, a lower feed member adjustably connected with said upper feed member and having a swivel connection with said thrust element, and means for holding one of said feed members against rotation.

3. A bush flanger comprising a spindle, flanging rollers pivotally mounted on the spindle, a fixed abutment on the spindle, a thrust element keyed on the spindle and having thrust rollers, an upper feed member having a swivel connection with the abutment, and anti-friction devices interposed between said members, a lower feed member having a swivel connection with the thrust element, and anti-friction devices between said lower feed member and thrust element, said feed members having a threaded connection with each other, a hand wheel connected with one of said feed members, and an extensible arm connected with the other of said feed members for holding it against rotation.

In testimony that I claim the foregoing as my own, I have hereto affixed my signature in the presence of two witnesses.

FRANK X. PFLUGER.

Witnesses:
  O. C. WALL,
  LAMBERT DUNBAR.

---

Copies of this patent may be obtained for five cents each, by addressing the "Commissioner of Patents, Washington, D. C."